United States Patent  [15] 3,653,110
King, Jr. et al.  [45] Apr. 4, 1972

[54] METHOD OF FABRICATING HOLLOW BLADES

[72] Inventors: Julian P. King, Jr., Los Angeles; Norman Klimmek, Palos Verdes Estates, both of Calif.

[73] Assignee: North American Rockwell Corporation

[22] Filed: Jan. 5, 1970

[21] Appl. No.: 666

[52] U.S. Cl. ............... 29/156.8 H, 29/156.8 B, 29/156.8 P, 29/156.8 T
[51] Int. Cl. ............... B21k 3/04, B23p 15/02, B23p 15/04
[58] Field of Search ............... 29/156.8 B, 156.8 H, 156.8 P, 29/156.8 T

[56] References Cited

UNITED STATES PATENTS

| | | | |
|---|---|---|---|
| 2,687,278 | 8/1954 | Smith | 29/156.8 H |
| 2,696,364 | 12/1954 | Bartlett | 29/156.8 H |
| 2,787,049 | 4/1957 | Stalker | 29/156.8 H |
| 2,807,437 | 9/1957 | Roush | 29/156.8 H |
| 2,817,490 | 12/1957 | Broffitt | 29/156.8 H |
| 2,825,794 | 3/1958 | Stalker | 29/156.8 H |
| 2,916,808 | 12/1959 | Wilkes | 29/156.8 H |
| 2,958,505 | 11/1960 | Frank | 29/156.8 H |
| 2,963,269 | 12/1960 | Gerdan | 29/156.8 H |
| 3,067,982 | 12/1962 | Wheeler | 29/156.8 H |
| 3,097,982 | 7/1963 | Stoner | 29/156.8 H |

Primary Examiner—John F. Campbell
Assistant Examiner—Donald P. Rooney
Attorney—L. Lee Humphries and Harold H. Card, Jr.

[57] ABSTRACT

A method of making jet engine turbine, fan or compressor blades containing longitudinal internal lightening openings by locating a plurality of rib elements between exterior cover plates, locating a removable spacer element between each of the adjacent rib elements, placing the resulting assembly in a die cavity, placing the assembly and die in a thin-walled retort, applying heat energy to the assembly sufficient to promote solid state diffusion of the material of construction of the assembly, drawing a vacuum about the assembly, applying sufficient compressive pressure to the assembly by a press operatively engaging the die to cause the material to flow plastically in combination with the applied heat energy, maintaining the application of heat energy and pressure sufficient to effect homogenization of the interfacial joints of the assembly, removing the bonded assembly from the die and leaching the spacer elements from the assembly.

7 Claims, 5 Drawing Figures

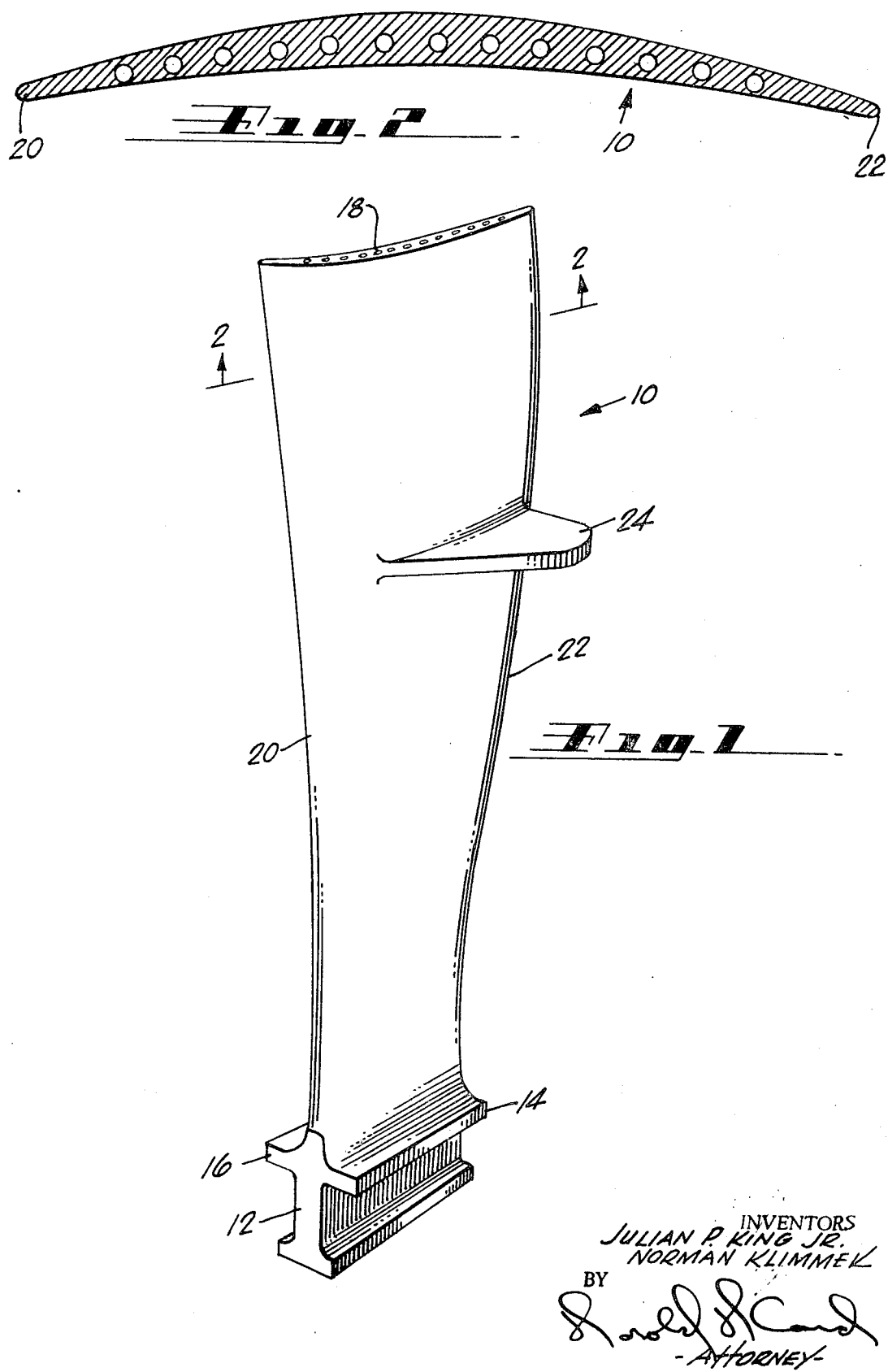

INVENTORS
JULIAN P. KING JR.
NORMAN KLIMMEK
BY
-ATTORNEY-

METHOD OF FABRICATING HOLLOW BLADES

BACKGROUND OF THE INVENTION

Blades are used in turbines, compressors and fans to convert the energy of flowing gases into rotative mechanical energy. Such clades rotate at extremely high velocity and as a result are subjected to substantial vibration as well as substantial centrifugal stresses. Also, normally such blades operate at extreme elevated temperatures. Because of the material destroying problems encountered by the blades, it is necessary to form the blades of a high strength material. A frequent construction material for blades is titanium or an alloy thereof. Titanium is relatively abundant, corrosion resistant and has has an extremely high strength to weight ratio even at elevated temperatures.

Blades are used in axial flow compressors of jet engines of aircraft with it not being uncommon to have as many as twenty stages of compression in a single compressor. For each stage of compression there is also a row of blades with 50 to 150 blades being employed each row. It is axiomatic in the aircraft propulsion art that a reduction of compressor blade weight results in about two and one-half times larger reduction of engine weight and a further reduction of about four times larger in airframe weight. For example, if each blade were lightened 1/10 of a pound, in a aircraft with four engines each having 2,000 blades, a reduction of as much as 10,000 pounds in airframe weight would result.

Because of the difficulty of joining titanium by welding other methods have been employed to effect fabrication of structural elements from titanium. One of the most successful methods is commonly referred to as "diffusion bonding." Diffusion bonding is characterized by an interatomic exchange contacting surfaces of the workpiece at suitable pressures and at temperature below the melting point of the workpiece material. Besides the metal or alloy thereof of titanium, other metals or alloys thereof which may be joined by diffusion bonding are aluminum, stainless steel, nickel, tantalum, molybdenum, zirconium, and columbium. The prior art involving solid stage diffusion bonding is represented in U.S. Pat. Nos. 3,145,466, 3,180,022, 3,044,160, 2,850,798, and 3,170,234.

SUMMARY OF THE INVENTION

The method of this invention for the fabrication of blades having internal lightening holes provides for the locating of a plurality of rib elements between a pair of exterior cover plates. The cover plates and rib elements are formed of the same material, it being contemplated for the material to be titanium or an alloy of titanium. Located between adjacent rib elements is to be a rod-like spacer element formed of a material different than that of the rib element. The spacer material must be removable by leaching with acid, and the rib elements and cover plates are to be substantially unaffected by the acid. A satisfactory material for the spacer can be steel.

The resulting assembly of the cover plates, the rib elements and the spacers are then placed in a die which has been made to the final design configuration desired for the blade. The die and assembly are placed in a thin-walled retort and a vacuum is drawn about the assembly. The temperature of the assembly is then elevated to a predetermined level and application of a predetermined pressure is effected by a press, preferably having heated platens, to cause solid state interatomic diffusion bonding of the work elements. The temperature and pressure are maintained until the bonding is complete. The assembly is then removed from the retort and die, cooled, and the spacer elements removed by leaching with acid. The blade is then in the final configuration.

One advantage of the method of this invention not readily apparent from the foregoing is that blades can be produced in substantially greater number in less time than heretofore possible, with a minimum of waste or scrap material and commensurately lower cost.

Another advantage of the method of this invention is that the blades resulting therefrom are lighter in weight at no reduction in strength or stiffness compared with blades of corresponding size and shape known to the prior art.

BRIEF DESCRIPTION OF THE DRAWINGS

FIG. 1 is a perspective view of one type of blade which can be formed by the method of this invention;

FIG. 2 is a sectional view taken along line 2—2 of FIG. 1 showing the internal lightening holes;

DETAILED DESCRIPTION

Figure 3:
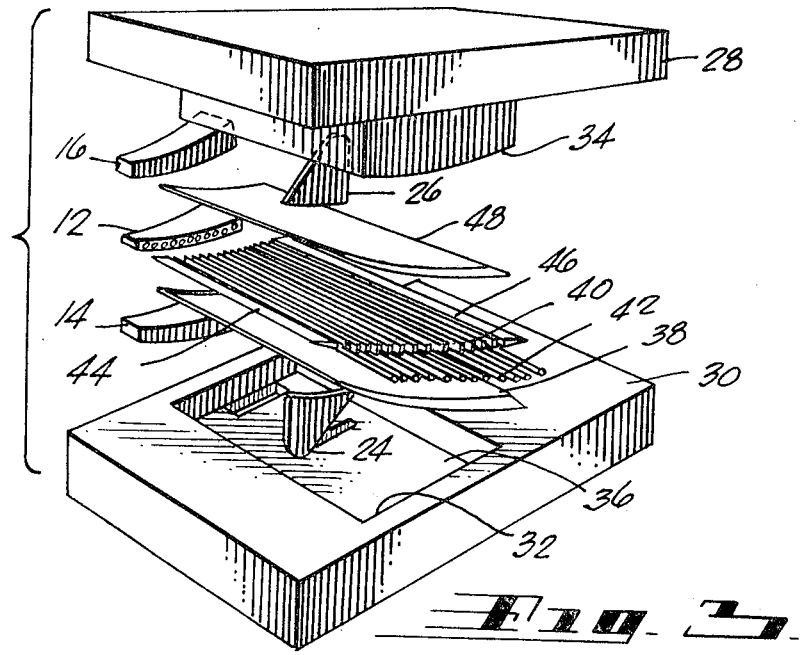
FIG. 3 is an exploded perspective view of the blade of FIG. 1 prior to the forming thereof in a die.

Referring particularly to the drawings, use of the novel method of this invention is to be seen in connection with fabricating turbine, compressor or fan blades such as blade 10 shown in FIG. 1. Each blade 10 is provided with a base portion 12 having flanges 14 and 16 to securely attach the blade 10 to a rotating hub (not shown). Blade 10 is an airfoil with a progressively changing angle of attack between base 12 and tip 18. Each blade 10 includes a lateral leading edge 20 and a lateral trailing edge 22. Intermediate the base 12 and the tip 18 are fins 24 and 26 which are to function as stabilizers, only fin 24 being visible in the view shown in FIG. 1. When many blades 10 are mounted in a complete circle forming a row around a hub, the fin 24 of one blade 10 contacts the fin 26 of the adjacent blade 10 and so forth until in essence a circular segmented flange results concentric with the hub. Thus, each of the fins 24 and 26 is designed to bear firmly against the next adjacent fin 26 or 24, respectively, thereby stabilizing the row of blades 10 against shock or vibration effects during high speed rotation of the row of blades.

The airfoil contours of each of the blades 10 are precision engineered and fabricated to produce maximum efficiency of engine performance at the particular speed and pressure conditions of the engine incorporating such blades. Any dents, punctures or other localized deformations in the contours of each blade 10 seriously compromise the aerodynamic properties of the blade and are completely intolerable. Such damage usually occurs by the entrance of a foreign object in the inlet airflow of the engine during operation of the engine. Under commercial airline engine overhaul procedures, such damage to a blade 10 would normally require the blade to be discarded and replaced by a new blade. Because of the greater number of blades in use in each engine and the number of engines in use, it should be apparent that some method of blade manufacture is in great need that would permit blades to be manufactured in quantity at low cost. The need for blades is further accentuated by the manufacture of new turbines, compressors and fans on an increasingly larger scale each year.

Figure 5:
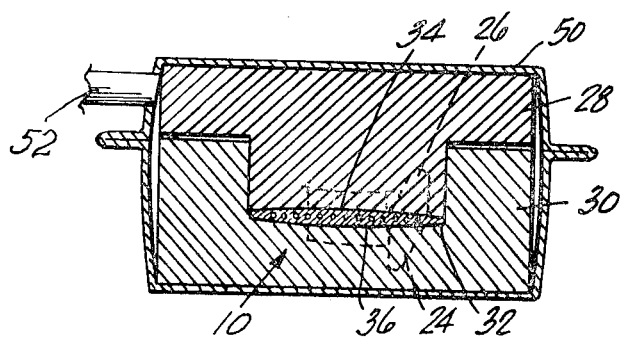
FIG. 5 is a sectional view similar to FIG. 4 showing the die in the position upon application of pressure.

The method of this invention permits manufacture of high quality blades at high rates and low cost. To effect the method of this invention it is necessary to employ the use of a restraining die shown by mating dies 28 and 30. Dies 28 and 30 may be fabricated by any suitable process known to the prior art, such as by casting from plaster patterns or cutting operations on metallic blocks. Die 28 is the male member with die 30 being the female member. With dies 28 and 30 in a completely mated relationship, as shown in FIG. 5, a cavity 32 therebetween is defined by the workfaces 34 and 36, respectively, of the dies 28 and 30. Cavity 32 has a contour oppositely and precisely corresponding to the surfaces of blade 10.

To form blade 10 in accordance with the method of this invention, a lower cover plate 38 is placed with cavity 32 against workface 36 of die 30. It is assumed that a plurality of standard sized plates 38 have been previously formed, with each plate 38 matingly cooperating within cavity 32. Plate 38 is formed of the desired material of construction, normally such material being titanium or an alloy thereof. A plurality of rib elements 40 are then placed upon plate 38 in a spaced apart relationship. Leading edge element 44 and trailing edge element 46 complete the laterally extending assembly of ribs 40 as either side thereof. Rib elements 40, 44 and 46 are preferably of the same material of construction as plate 38. A rod-like spacer element 42 which may be either circular, square or other cross-sectional form, is positioned between each of the spaced apart rib elements 40. The spacer elements 42 are constructed of a different material than that of the plate 38 and rib elements 40, 44, and 46, such a material not being titanium or an alloy thereof. It is desired that the material of the spacers 42 be capable of being attacked by acid, one such material being certain compositions of steel. The titanium construction of the plate 38 and the rib elements 40, 44 and 46 are to be substantially unaffected by acid.

Within the workface 36 is designed a second cavity (not shown) to permit the placing of fin 24 therein and permit its resultant integral bonding to plate 38. The material of construction of fin 24 is normally the same as that of plate 38.

An upper cover plate 48 is placed in contacting relationship with rib elements 40, 44 and 46 and is formed of the same material as plate 38. It is also presumed that a plurality of standard sized plates 48 have been previously formed, with each plate 48 matingly cooperating within cavity 32. A third cavity (not shown) is also formed within die 28 for insertion of fin 26 to permit its resulting integral attachment to plate 48.

The base 12 is to be formed simultaneously with the forming blade 10, base 12 cooperating with one end of the rib elements 40. Flange 14 is placed so as to contact workface 36 and flange 16 contacts workface 34.

Figure 4:
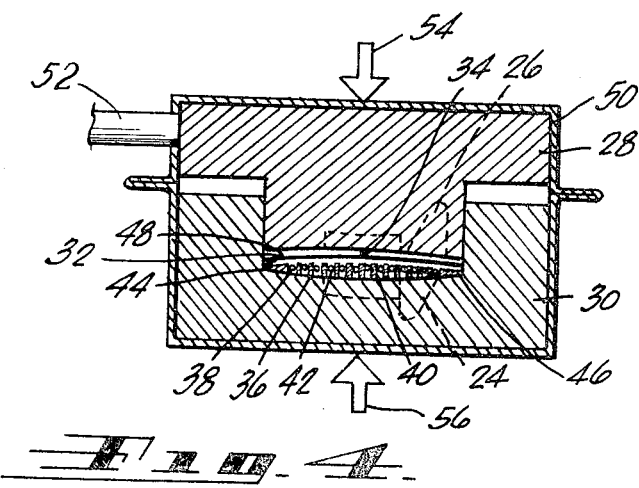
FIG. 4 is a sectional view through the retort and die employed in this invention showing the blade in position within the die prior to application of pressure.

With the resulting assembly of the blade 10 being located within cavity 32 and die 28 in a mating position with die 30, a thin-walled retort 50 encloses dies 28 and 30. A conduit 52 as shown in FIG. 4 is connnected to retort 50 and communicates with a vacuum pump (not shown). Upon actuation of the pump a vacuum is drawn within retort 50 and application of force by suitable press means (not shown) forces together dies 28 and 30. The side walls of retort 50 flex to compensate for the compressing of the dies 28 and 30.

The temperature of the dies and resulting assembly is to be raised to where upon application of the pressure, solid state diffusion bonding of the assembly occurs. The source of heat energy is not shown, it only being required that the assembly is to be heated. Where the assembly material is titanium, complete bonding will occur within a reasonable time with the temperature established at a minimum of 1,600° F. and the pressure established at approximately 2,000 p.s.i. Such pressure and temperature must be maintained for several hours until the bonding is complete. It should be clear that the pressure at which bonding is achieved varies with the characteristics of the metal being bonded and the temperatures employed. For example, the minimum pressure for titanium is about 300 p.s.i., for stainless steel about 700 p.s.i., and for columbium about 3,500 p.s.i. According to the characteristics of the workpiece material, the temperature, pressure and time will vary to effect a complete bond. Also, the thickness of the members being joined is a factor.

During the bonding operation a continuous vacuum is maintained. This provides a clean atmosphere necessary for bonding. Surface oxidation of titanium and other diffusion bondable metals prevents diffusion bonding. The vacuum serves to evacuate oxygen from inside retort 50, thus avoiding oxidation of workpiece components during the bond cycle.

It is quite important that the volumetric mass of the material of the assembly within cavity 32 is equal to or greater than the void created between dies 28 and 30. By the application of the compressive force vertically through the assembly depicted by arrows 54 and 56, such vertical force will cause a lateral or horizontal force to be exerted by the assembly against the cavity 32. In the absence of such a lateral restraint, the compressive force would produce considerable increase in the length and width thereof simultaneous with a reduction in the thickness of the assembly. However, since lateral deformation is restrained, a considerable reaction force results transversely through the assembly. It is this lateral component of force which is essential for solid state diffusion bonding to occur. If the volumetric content of the assembly was insufficient to occupy completely the void of cavity 32, the necessary lateral force would not occur through the assembly. Ideally, the volumetric mass of the assembly should be equal to the volume of cavity 32. Practically, a very slight oversizing of the mass of the assembly occurs on the order of 0.01 percent to 10 percent. To compensate for the excess material, a plurality of small hiatuses in the way of openings or recesses (not shown) are to be provided within the surfaces of the workfaces 34 and 36. The excess material is to then flow into these hiatuses during the bonding process, the size of these openings being dependent upon the pressure applied to the dies, since larger openings would require less force to permit escape of workpiece material from cavity 32.

Diffusion bonding is characterized by the formation of a metal-to-metal bond between contacting surfaces at suitable pressure and at temperatures below the melting point of the metal. Bonds which approach the strength of the present metal can thereby be obtained. In certain instances, a thin interleaf material or eutectic former is provided, and in other forms of diffusion bonding no interleaf material is necessary. The mechanism of diffusion bonding involves surpassing the compressive yield strength to achieve plastic deformation of the workpiece material. This characteristic of plastic deformation under pressure and temperature may be taken advantage of in this invention to produce a finished part having smooth surfaces requiring very little additional work. Only the removal of the flash and the excess mass (which flowed into the hiatuses) need to be accomplished. Also, fillets will be formed at the points of contact of the ribe elements 40 and the plates 38 and 48, such fillets strengthening the joint by reducing stress concentration.

Prior to the trimming operation of the blade 10, the blade is cooled and then acid is used to leach the steel spacer elements 42 from the titanium assembly. This leaching results in the complete dissolving of the spacers 42 leaving the desired hollow titanium blade 10. Ultrasonic agitation of the leaching bath or application of a fresh leaching solution of the metal interface may be useful in accelerating the etching rates. Chemical etching of the titanium surfaces subsequent to removal of the spacers 42 will be necessary to remove the steel interaction products.

We claim:

1. A method of fabricating blades having at least one internal lightening hole comprising:
   locating at least one rib element between a pair of cover plates;
   locating at least one spacer element between the cover plates and adjacent the rib element;
   making the material of construction of the spacer element different than that of the cover plates;
   providing a pair of mating dies the workfaces of which are adapted to define a cavity having the precise size and shape of the blade;
   placing the resulting assembly of the element and the spacer element and the cover plates within the dies, the volumetric content of the resulting assembly being at least equal to the volume of the cavity when the dies are in a mating relationship;
   exposing the resulting assembly to sufficient heat energy to effect diffusion bonding of the interfaces of the cover plates and the rib elements at a predetermined pressure;
   forcing said dies and the resulting assembly together to produce the predetermined pressure simultaneously with the application of said heat energy thereto, and
   maintaining said heat energy and said pressure for a sufficient period of time to effect diffusion bonding of the cover plates and the rib elements.

2. The method as defined in claim 1 including the additional step of:
   removing the resulting assembly from the dies and pressure environment; and
   removing the spacer element from the assembly.
3. The method as defined in claim 2 wherein:
   said removing the spacer element from the assembly is done by exposing said spacer element to an acid adapted to leach said spacer element.
4. A method of fabricating turbine, compressor and fan blades, each blade having internal lightening holes, the method comprising:
   locating a plurality of metallic rib elements between a pair of metallic cover plates;
   locating a plurality of metallic spacer elements between the cover plates with one spacer element being intermediate adjacent rib elements;
   making the material of construction of the rib elements and the cover plates substantially unaffected by acid;
   making the material of construction of the spacer elements attackable by acid;
   providing a pair of mating dies the workfaces of which are capable of defining a cavity the precise size and shape of a blade;
   placing the resulting assembly of the rib elements and the spacer elements and the spacer elements and the cover plates within the cavity between the dies;
   defining the volumetric content of the resulting assembly to be at least equal to the volume of the cavity when the dies are in a mating relationship;
   forming a chemical reaction free environment for said assembly and dies exposing the resulting assembly to sufficient heat energy to effect diffusion bonding of the interfaces of the cover plates and the rib elements to a given compressive pressure for a given period of time;
   forcing said dies and said assembly together to produce the given compressive pressure while applying said heating and forming said environment; and
   maintaining said heat energy and said pressure and said environment of said given period of time to effect diffusion bonding of said cover plates and said rib elements.
5. The method as defined in claim 4 including the additional steps of:
   removing the resulting assembly from the dies and temperature environment; and
   removing the spacer elements from the assembly.
6. The method as defined in claim 5 wherein:
   said removing of said spacer elements from the assembly is by leaching with acid.
7. A method of fabricating turbine, compressor and fan blades, such blade being a complete unitary mass having internal lightening holes, the method comprising:
   forming a plurality of standardized upper cover plates made partially of titanium;
   forming a plurality of standardized lower cover plates made partially of titanium;
   locating a plurality of at least partially titanium rib elements between adjacently spaced upper and lower cover plates;
   locating a plurality of rod-like primarily steel spacer elements between the adjacently spaced upper and lower cover plates with a single spacer element being intermediate every pair of adjacent rib elements;
   providing a pair of mating dies the workfaces of which are capable of defining a cavity the precise size and shape of a blade;
   placing the resulting assembly of the rib elements and the spacer elements and the upper and lower cover plates within the cavity between the dies;
   defining the volumetric content of the resulting assembly to be at least equal to the volume of the cavity when the dies are in a mating relationship;
   placing the resulting assembly and dies within a thin-walled retort;
   filling said retort with an inert gas to form a chemical reactive free environment, exposing the resulting assembly to sufficient heat energy to place the temperature of the assembly between 1,600° F. and 1,725° F., and applying force to press the dies together wherein the compressive force is within the range from about 2,000 p.s.i. to about 5,000 p.s.i.;
   maintaining said temperature and pressure about the resulting assembly for a sufficient period of time to effect solid state diffusion bonding of the cover plates and the rib elements to form fillers by plastic deformation of said rib elements;
   removing the resulting assembly from the dies and pressure environment;
   cooling the resulting assembly; and
   leaching by acid each of said spacer elements from the resulting assembly.

* * * * *